United States Patent [19]
Brazas

[11] Patent Number: 5,471,548
[45] Date of Patent: Nov. 28, 1995

[54] SEGMENTED WAVEGUIDE GRATINGS USED AS OPTICAL RECORDING SENSORS

[75] Inventor: John C. Brazas, Rochester, N.Y.

[73] Assignee: Eastman Kodak Company, Rochester, N.Y.

[21] Appl. No.: 252,635

[22] Filed: Jun. 2, 1994

Related U.S. Application Data

[63] Continuation of Ser. No. 4,811, Jan. 15, 1993, abandoned.

[51] Int. Cl.$^6$ .................................. G11B 7/00; G02B 6/34
[52] U.S. Cl. ........................ 385/37; 385/14; 369/44.11; 369/44.12
[58] Field of Search ........................ 385/37, 14, 15; 359/566, 569; 369/44.12, 44.11

[56] References Cited

U.S. PATENT DOCUMENTS

| | | | |
|---|---|---|---|
| 4,758,062 | 7/1988 | Sunagawa et al. | 385/37 X |
| 4,833,561 | 5/1989 | Sunagawa et al. | 360/114 |
| 4,868,803 | 9/1989 | Sunagawa et al. | 369/44 |
| 4,885,732 | 12/1989 | Sunagawa et al. | 369/44 |
| 4,923,300 | 5/1990 | Michel et al. | 385/37 X |
| 4,991,919 | 2/1991 | Nishiwaki et al. | 385/37 |
| 5,044,718 | 9/1991 | Kando | 385/37 X |
| 5,081,615 | 1/1992 | Sunagawa | 369/44.12 |
| 5,105,403 | 4/1992 | Kando et al. | 369/44.12 X |
| 5,153,860 | 10/1992 | Sunagawa et al. | 369/13 |
| 5,159,650 | 10/1992 | Nishiwaki et al. | 385/37 |
| 5,208,800 | 5/1993 | Isobe et al. | 385/37 X |
| 5,235,581 | 8/1993 | Miyugawa et al. | 369/44.12 |

OTHER PUBLICATIONS

Shogo et al., *An Integrated–Optic Disk Pickup Device*, Journal of Lightwave Technology, vol. LT–4, No. 7, Jul. 1986.

*Primary Examiner*—Rodney B. Bovernick
*Assistant Examiner*—Hemang Sanghavi
*Attorney, Agent, or Firm*—Raymond L. Owens

[57] ABSTRACT

An apparatus and method for detecting focus and tracking error signals and monitoring pointing in an optical device wherein a return beam of light undergoes changes in angle and collimation in response to changes in focus and tracking are provided. A waveguide device includes a substrate having a surface, a waveguide layer on the surface having segments of different thicknesses for adjusting an effective refractive index of each segment, a cladding contacting the waveguide layer with the waveguide layer positioned between the substrate and the cladding, and a linear input coupling grating for input coupling the return beam. The grating includes a processing grating to input couple light to effect a desired change in input coupled intensity with defocus or detracking, an isolation grating for decoupling light scattered within the waveguide, and an interchip grating to couple light already processed to focus and tracking detectors. The grating and detectors are used to generate focus error signals, tracking error signals, and pointing error signals.

6 Claims, 11 Drawing Sheets

SEGMENTED WAVEGUIDE GRATINGS USED AS OPTICAL RECORDING SENSORS

This is a Continuation of U.S. application Ser. No. 004,811, filed Jan. 15, 1993, now abandoned.

CROSS-REFERENCE TO RELATED APPLICATIONS

This application is related to cofiled application Ser. No. 08/004,020 entitled Segmented Waveguide Gratings Used As Optical Tilt And Displacement Sensors.

TECHNICAL FIELD OF THE INVENTION

The invention pertains generally to optical recording technology and observing focus and tracking error signals needed during optical head writing and readout, and, more particularly, to a linear grating used for input coupling into waveguides to process focus and tracking error signals.

BACKGROUND OF THE INVENTION

For optical recording to viably compete with magnetic recording, optical heads of reduced size, weight and cost must be developed while maintaining the same level of performance. The evolution of optical heads has produced light weight bulk optical systems, and, more recently, prototypes of complete and partial integrated optical systems. Integrated optical components have the advantages of being planar, having optical component alignment as part of fabrication, and facilitating integration with detectors and preamplifiers when using silicon based substrates.

A problem encountered in designing new optical-recording error-signal-detection methods and systems is observation of decollimation in the beam returning from the optical disk when the disk is out of focus for the objective lens, defocus, and asymmetry of the intensity in response to a tracking error. Generally, the methods for detecting the tracking error can be much simpler than for the focus-error detection, not requiring the critical alignment of optical components. The processing of the return beam should produce error signals which provide the resolution needed for adjustment of the objective lens position at levels much finer than its depth of focus and track width. A standard practice for correcting the position error for the objective focus is using a bipolar signal providing directional and amplitude information for the servo system. The method for correcting the tracking error is the use of a sinusoidal signal also providing an amplitude and directional information. The detection method for focus error heretofore used in waveguide systems has been the pupil obscuration method as described by A. Marchant, *Optical Recording: A Technical Overview*, Addison-Wesley, pp. 165–187 (1990).

New methods for processing optical recording information using waveguides are continually evolving. A reference which provides background for waveguides and waveguide gratings is *Integrated Optics*, Springer-Verlag (1975), edited by T. Tamir. Waveguide gratings are used to couple light into the waveguide and then to process information using a second lensing element or to couple and focus using focusing grating couplers. These concepts have been applied to magneto-optical (MO) systems as disclosed by Ura et al., *An Integrated-Optic Disk Pickup Device*, J. Lightwave Technol., LT-4, p. 913–918 (1986). These concepts have also been applied to write-once systems as disclosed in U.S. Pat. No. 4,833,561 and Japanese Patent Application, No. 62-166332. It is therefore desirable to have a simple, compact device for processing information.

SUMMARY OF THE INVENTION

The present invention is directed to providing new optical recording error signal detection methods for observing decollimation of the beam returning from the optical disk when the disk is out of focus for the objective lens (focus error or defocus) and position errors for the spot focused onto the tracks of the disk (tracking error or detracking). The processing of the return beam produces an error signal which provides the resolution of position sensing needed for adjustment of the objective lens at levels better than its depth of focus and cross-track positioning much less than the width of a single track.

According to one aspect of the invention, a waveguide device comprises a substrate having a surface, a waveguide layer on the surface having segments of different thicknesses for adjusting an effective refractive index of each segment, a cladding contacting the waveguide layer with the waveguide layer positioned between the substrate and the cladding, and a linear input-coupling grating for input coupling a return beam which undergoes changes in collimation in response to changes in focus.

The grating includes a processing grating to input couple light to effect a desired change in input-coupled intensity with defocus or detracking of a beam of light at an optical surface, an isolation grating for decoupling light scattered within the waveguide, and an interchip grating to couple light already processed to focus and tracking detectors. The input coupling grating is formed on the waveguide layer at an interface of the waveguide layer and the cladding or is formed on the surface of the substrate underlaying the waveguide layer.

According to another aspect of the present invention a method for forming an optical device wherein a return beam of light undergoes changes in collimation and intensity symmetry in response to changes in focus and tracking comprises the steps of forming a substrate, forming a waveguide layer on a surface of a substrate, forming a cladding and positioning the waveguide layer between the cladding and the substrate, forming waveguide regions of different thicknesses and adjusting an effective refractive index of each region, and input coupling the return beam via a linear input coupling grating.

Integrated optical components have the advantage of being planar. With integrated optical components, alignment is part of the fabrication process and integration of optical components with detectors and preamplifiers is facilitated when using silicon based substrates. Also, integrated optical elements described herein provide new methods of detecting error signals not available by conventional optical components.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

The present invention uses a linear waveguide grating for input coupling of light to detect the focus and tracking error signals. The error signal detection is based on processing of the optical beam using a segmented grating to observe changes in the intensity of coupled light due to asymmetric beam intensity (tracking error) or changing incident angle (focus error). The principle of operation for detection of focus error signals (FES) is based on the angular dependence of the input coupling efficiency of the grating and the level of de-collimation for the return beam and is discussed in detail below.

Figure 1:
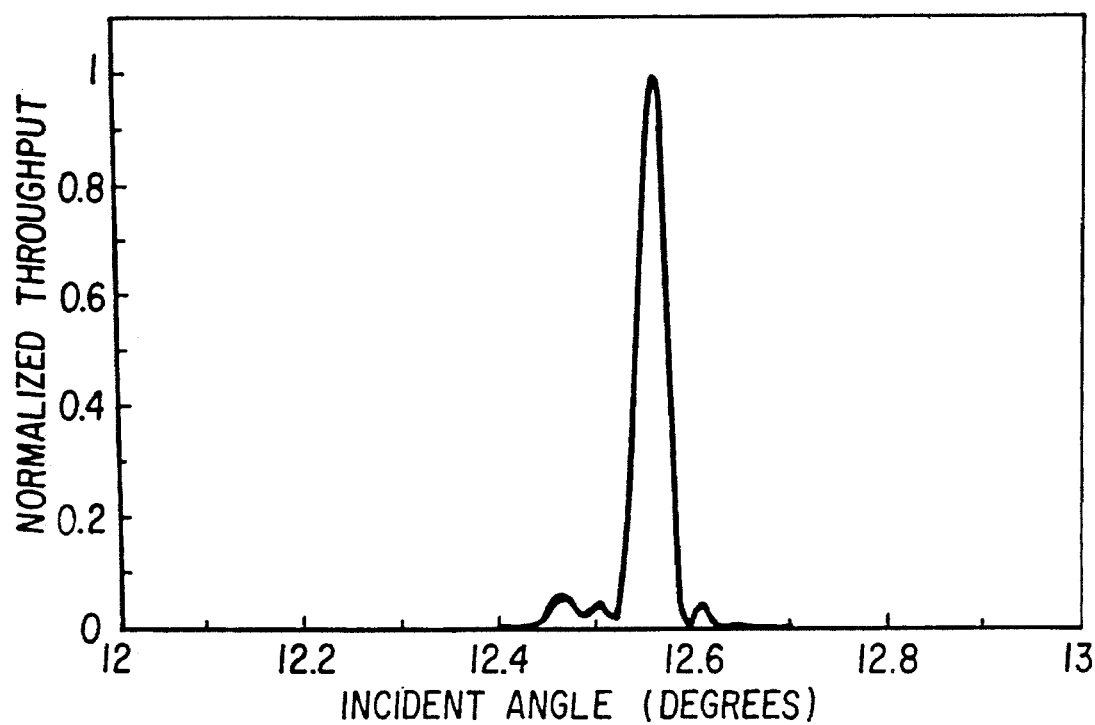
FIGS. 1–3 are graphs showing experimental angular sensitivity of the coupling efficiency for incident grating lengths of 1.0 mm, 0.5 mm, and 0.25 mm, respectively
Figure 2:
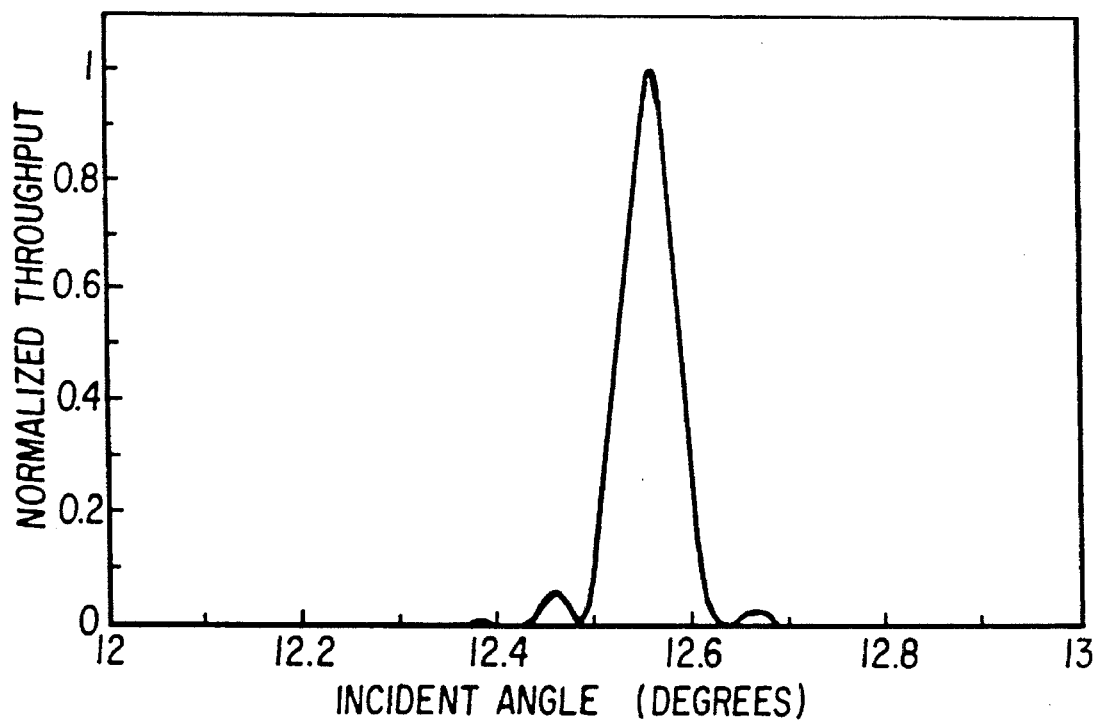
Figure 3:
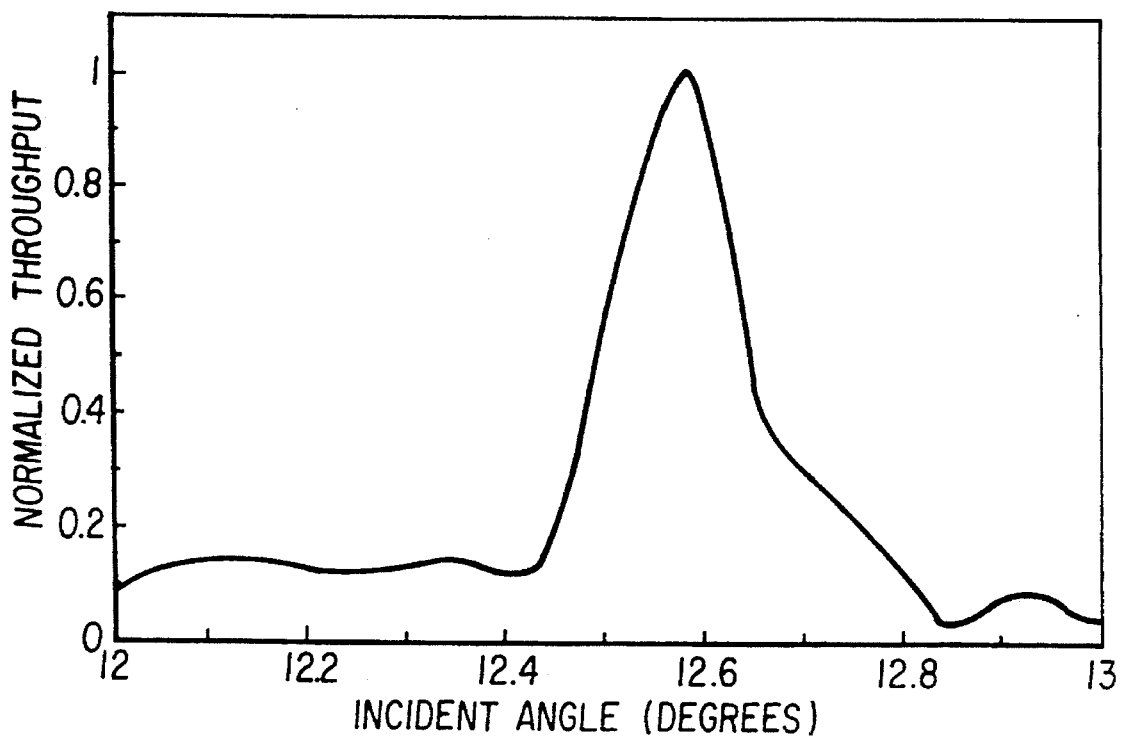

Input coupling efficiency of gratings have an angular dependence based on diffraction theory and the dimensions defining the grating system, i.e., beam waist or apertures of the incident beam, intrinsic grating coupling length and grating length as demonstrated with a grating to couple 632.8 nm light into a waveguide at an angle of 13 degrees relative to the normal of the waveguide plane. The curves of FIGS. 1–3 plot relative intensity as a function of incident angle and were generated for grating lengths of 1.0 mm, 0.5 mm, and 0.25 mm, respectively. The angular sensitivity of the grating can be stated in terms of the intensity full-width-half-maximum (FWHM). Measured values for the apertures above were 0.035 degrees, 0.067 degrees and 0.132 degrees, respectively.

The use of a slit-like grating introduces an angular spectrum into the discrete diffraction orders analogous to the effect of a slit on a planewave where the far-field diffraction will be diverging at a rate inversely proportional to the slit size. For a waveguide grating system, the waveguide will select the portion of the angular spectrum which overlaps the angular width associated with the propagation angle of the guided mode. Because the angular content of the diffracted order increases with a decreasing grating length, $L_{gr}$, there will be an increase of the full-width-half-maximum (FWHM) for the angular dependence of the input coupling efficiency. Both the FWHM and peak efficiency of the angular dependence for input coupling are characteristics of the waveguide grating and will be referred to as the grating response in this discussion. The ability to control the grating response by adjusting the grating length is important for selecting the working range of a practical device. Also, the waveguide grating design affects the grating response by determining the characteristic coupling length, $1/\alpha$, where $\alpha$ is the coupling coefficient associated with waveguide gratings as described in Tamir. The coupling length affects the angular width of the order coupled to the guided mode in a similar fashion to the value of $L_{gr}$ by also determining the length of grating over which light is input or output coupled. To maximize coupling efficiency, $1/\alpha$ is near the value of $L_{gr}$.

Figure 4:
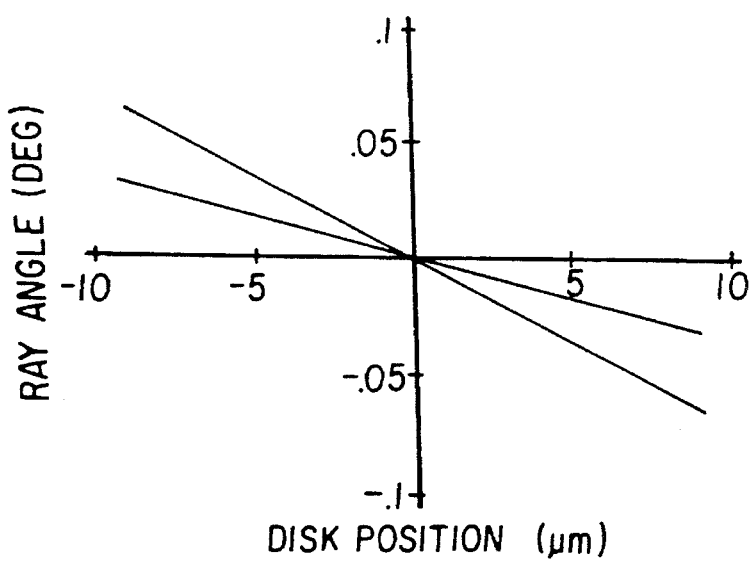
FIG. 4 is a graph showing ray slopes for the return beam at relative aperture positions of 0.5 and 1.0.

In considering a focus error signal, the return beam decollimation for a given disk position error is calculated by knowing the numerical aperture (NA) of the objective lens. Modeling with a 0.5 NA objective lens, the angular change was calculated for rays at relative aperture positions of 0.5 and 1.0 for a sweep of the disk position through focus (FIG. 4). For detection of ray angle changes from de-collimation, the highest amplitude signal occurs at larger aperture positions.

Comparing the decollimation of an optical recording system when focus errors occur with the angular sensitivity of gratings, the angle change of the marginal ray for ±4.5 micron positioning error of the disk is comparable to the angular sensitivity of the grating having a 0.7 mm grating length. As the aperture radius of the sample return beam decreases, the comparative range of the disk positioning error increases linearly. For a relative aperture position of 0.5, a ±9 micron position error is comparable to the grating response. Selecting a band of aperture radii by an appropriate grating length ensures that an adequate amount of light couples into the waveguide and produces a broadening of the grating response based on the diffraction effects of the applied aperture grating length and the range of angles appearing incident on the aperture.

Figure 5:
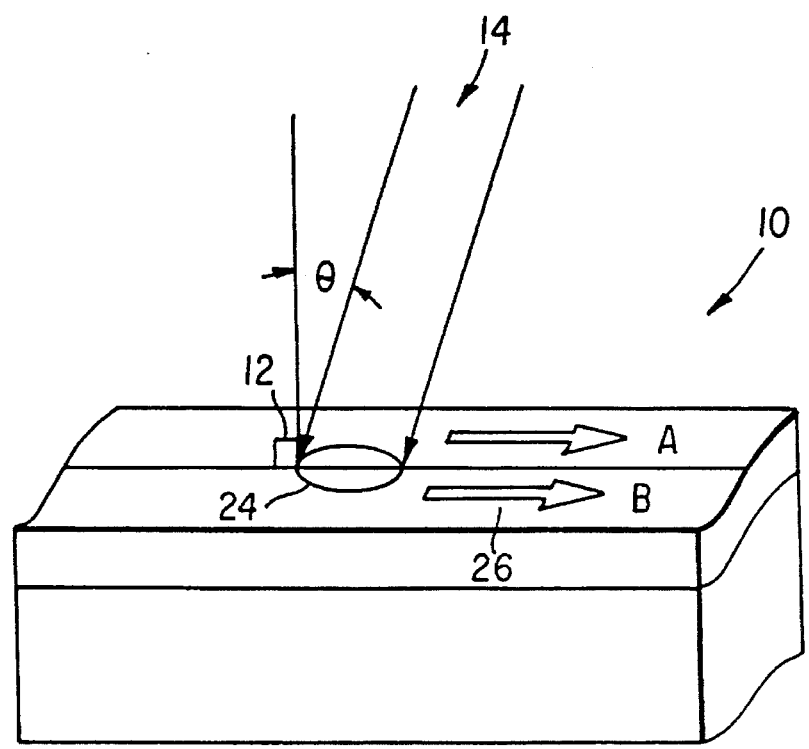
FIG. 5 is perspective drawing of a segmented waveguide having segments A and B.

Referring to FIG. 5, the standard practice for correcting defocus errors is using a bipolar focus error signal (FES). To accomplish this using the system described above, an optical device 10 has adjacent regions A and B of an input coupling grating 12 fabricated to have a difference in their nominal coupling angle with peak values ideally separated by about the same value as the angular sensitivity. The response of each segment to a rotation of the grating 12 relative to an incident beam 14 is similar to the response suggested in FIGS. 1–3 for coupling efficiency as a function of incident angle. Similarly, a sweep of incident angle by changing the mirror position of a mock-optical head produces results like those shown if the input beam is sampled appropriately. If the nominal input angle is selected to be the intersection of the grating responses, then a bipolar signal can be generated by the intensity difference in regions A and B for detecting decollimation.

The waveguide can be formed by vacuum deposition of an organic glass useful for the formation of passive-waveguide devices. The film forming process is a line-of-sight deposition of a mixture of similar organic compounds to generate glass thin-films well suited for use as optical waveguides which produce waveguides with low propagation losses between 0.2 to 0.5 dB/cm, good thermal stability and refractive index reproducibility. The standard coating conditions were a chamber pressure less than $5 \times 10^{-6}$ Torr, an ambient substrate temperature, a deposition rate of 0.5 nm/sec, and a source-substrate separation of 65 cm. The resulting films had thickness uniformities of $\pm 0.6\%$ over 50 cm and accuracies within $\pm 1\%$ were obtained with optical monitoring techniques. Additional material can be added through a thin metal deposition mask when areas of different thickness are needed.

Example 1 Demonstration of Pointing Error Signal Generation

Referring to FIGS. 5–8, a waveguide grating can be used to monitor the incident angle of an optical beam by simply detecting an intensity change of the input coupled light with a change in incident angle. However, a change in the incident angle could produce either an increase or decrease of the coupled light depending on the initial alignment of the grating. An alternative is to divide the grating into two segments with the input coupling angles for their peak efficiencies separated by about the FWHM. The input-coupling angle for peak intensity within the waveguide for each segment can be selected by altering the waveguide system refractive indices, the grating period, or the waveguide thickness to affect the effective refractive index. The present invention creates a difference in the thickness of the waveguide.

The grating design included fabrication of the grating in a Pyrex substrate with a period of 0.45 microns, a depth of 28 nm, and a duty cycle of 50% with a square-wave profile. A film of organic glass was vacuum deposited onto the substrate to form a waveguide having a uniformity of better than 1% and a thickness of 0.6 microns to within 1% error. The index of the waveguide was about 1.66 at a wavelength of 632.8 nm. The nominal grating coupling angle was about 13 degrees.

Figure 6:
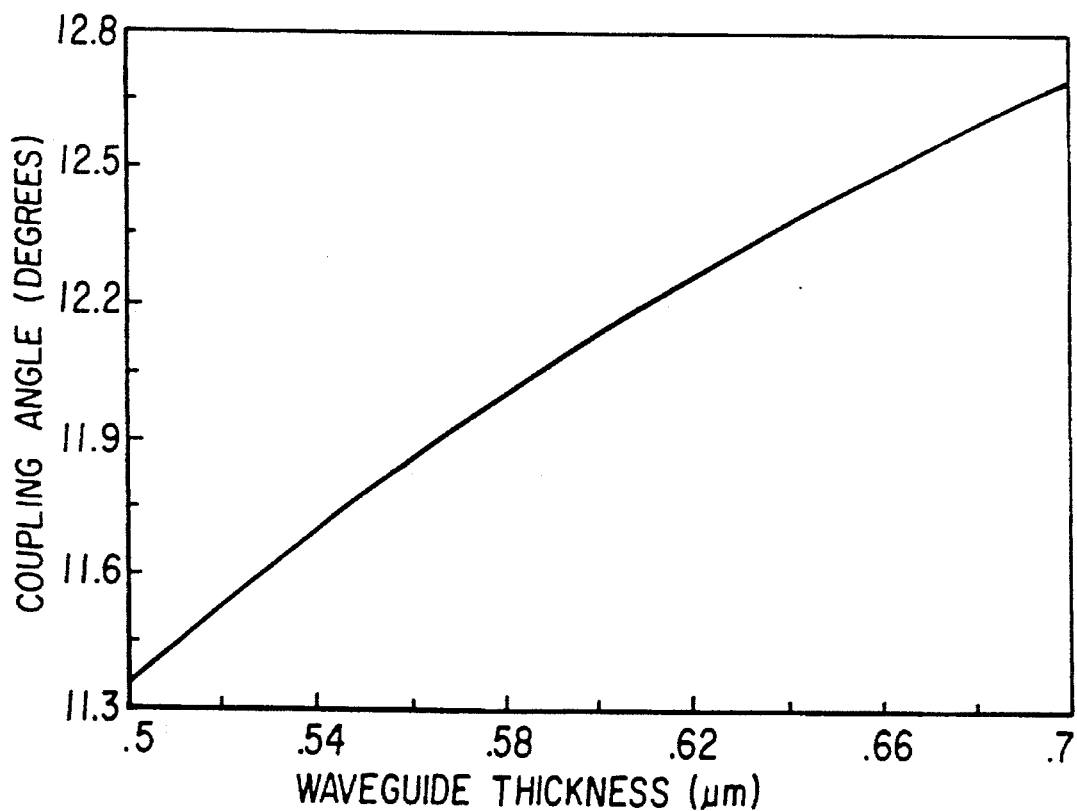
FIG. 6 is a graph showing the dependence of the nominal coupling angle on waveguide thickness.

FIG. 6 shows the calculated sensitivity of the coupling angle to waveguide thickness where the grating pitch is 0.45 µm. Masking the sample and then depositing an additional 3.5 nm into region B of FIG. 5 shifts the local coupling angle by 0.016 degrees. Using a collimated input beam and monitoring the input coupled intensity, imaging light scattered from the waveguide onto a CCD array, the relative amount of light coupled into the waveguide regions can be monitored.

Figure 7:
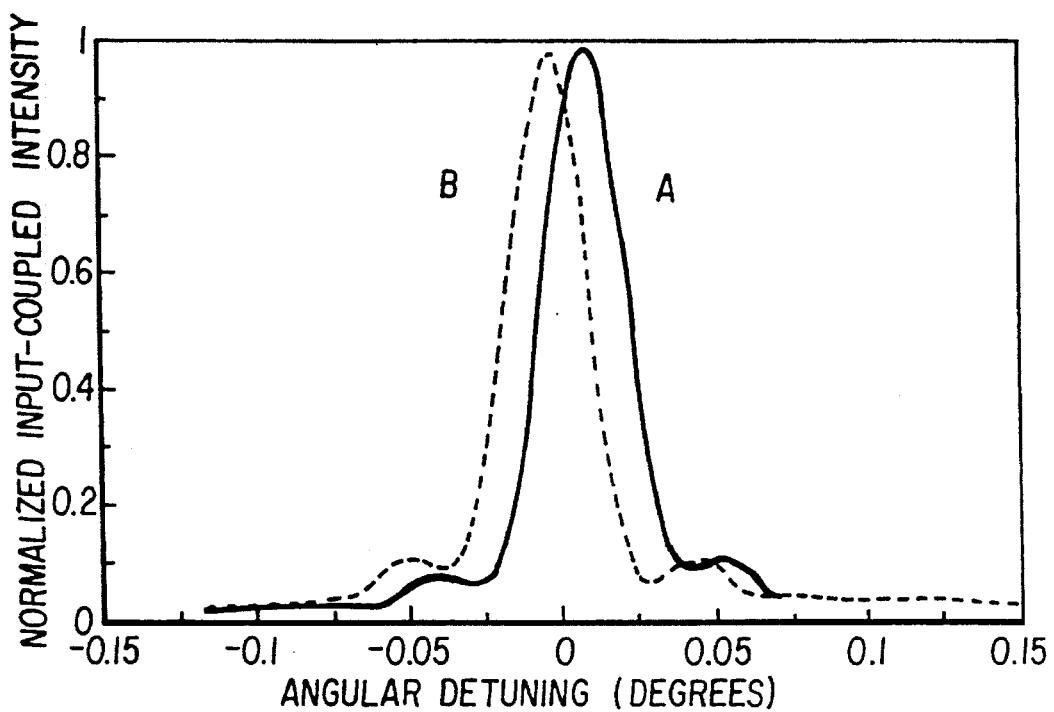
FIG. 7 is a graph showing experimental results for segments A and B of the segmented grating when the grating is rotated relative to the incident light beam.

FIG. 7 illustrates this with experimental results. When the angle of incidence of the optical beam is adjusted to the angle corresponding to the intersection of the response of the grating segments, an increase or decrease of the difference of these signals of these segments can be directly related to the direction and magnitude of the incident angle change.

Figure 8:
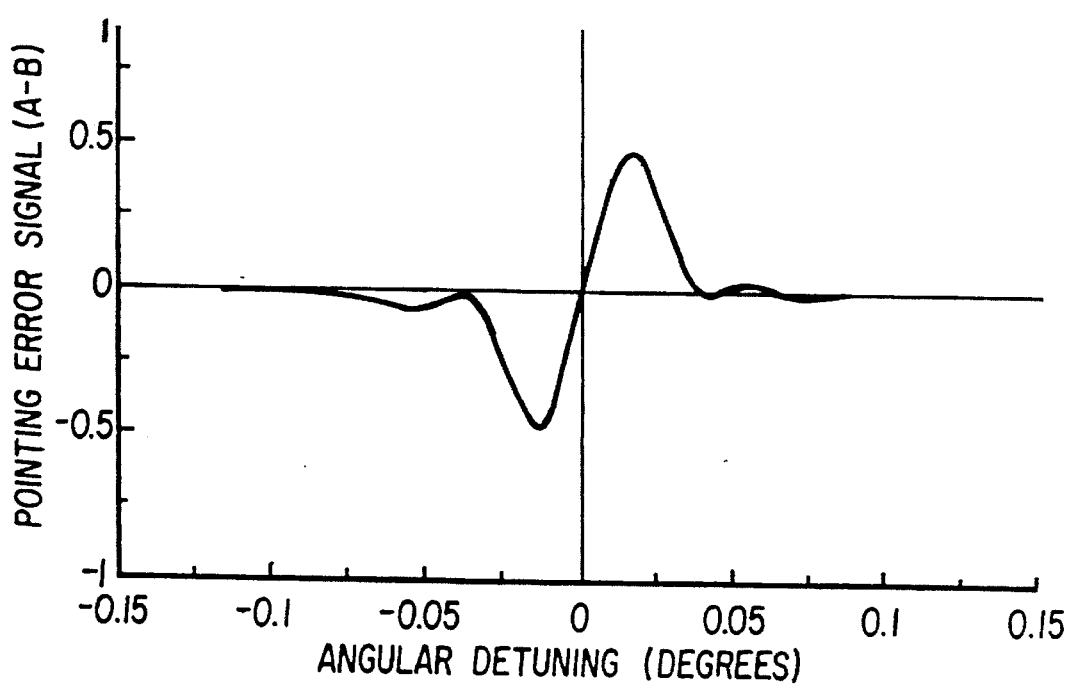
FIG. 8 is a graph showing the difference of the signals for the segments in FIG. 7, a pointing error.

FIG. 8 shows the difference of the signals for the segments, a pointing error signal (PES). The PES could be used as a simple monitor of incident angle during alignment or for real-time correction in a dynamically operated system. The features of the signal would include a bipolar output providing information about the direction of the error, a zero crossing which can be used for indication of no error, and a linear working region where the error is proportional to the magnitude of the signal. The working range is determined by the peak-to-peak separation of the grating responses and can be extended with the broadening of the angular widths of each grating response and separation of the input coupling angle for the peak intensities of each segment. Ideally, the grating responses should overlap through their most linear section to provide a linear relation between the error signal and the change of incident angle.

This example demonstrates a simple method for modifying a grating to produce desirable characteristics with a single fabrication step and avoiding the alignment difficulties of alternatively modifying the grating pitch. The waveguide and thickness step were fabricated during the same coating process using an externally controlled translation stage to position a mask to cover a portion of the grating during the deposition.

Example 2 Demonstration of Collimation Error Signal Generation

Figure 9:
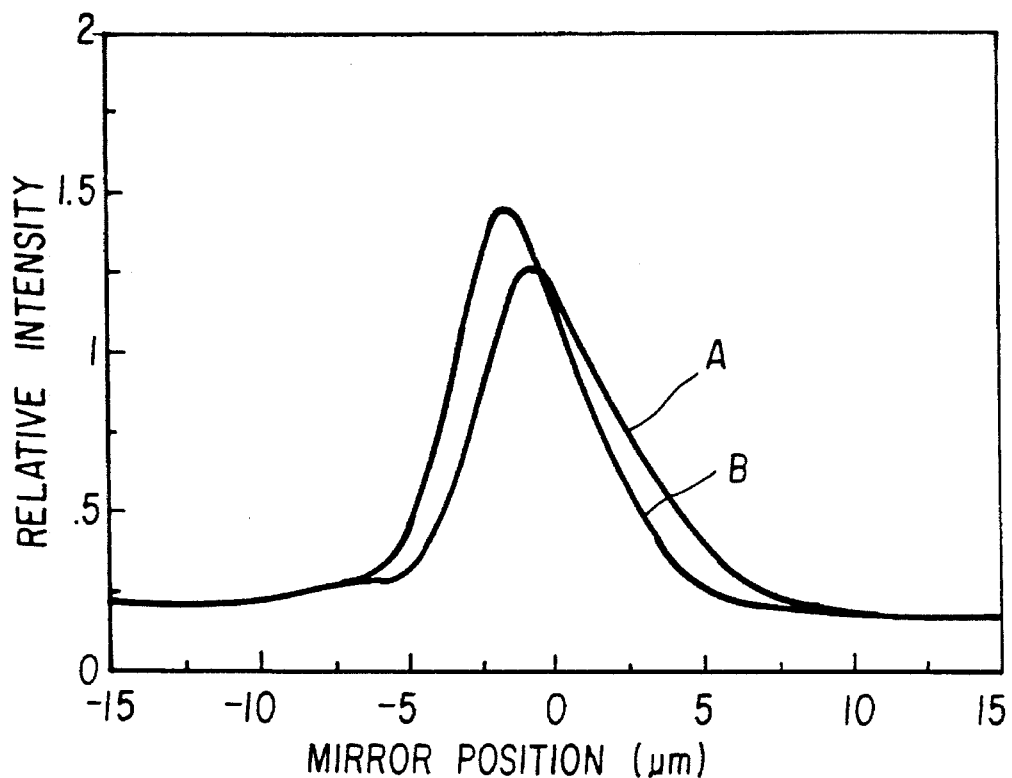
FIG. 9 is a graph of the experimental input-coupling response of the two regions for a sweep of the mirror through the focus of the objective lens.
Figure 10:
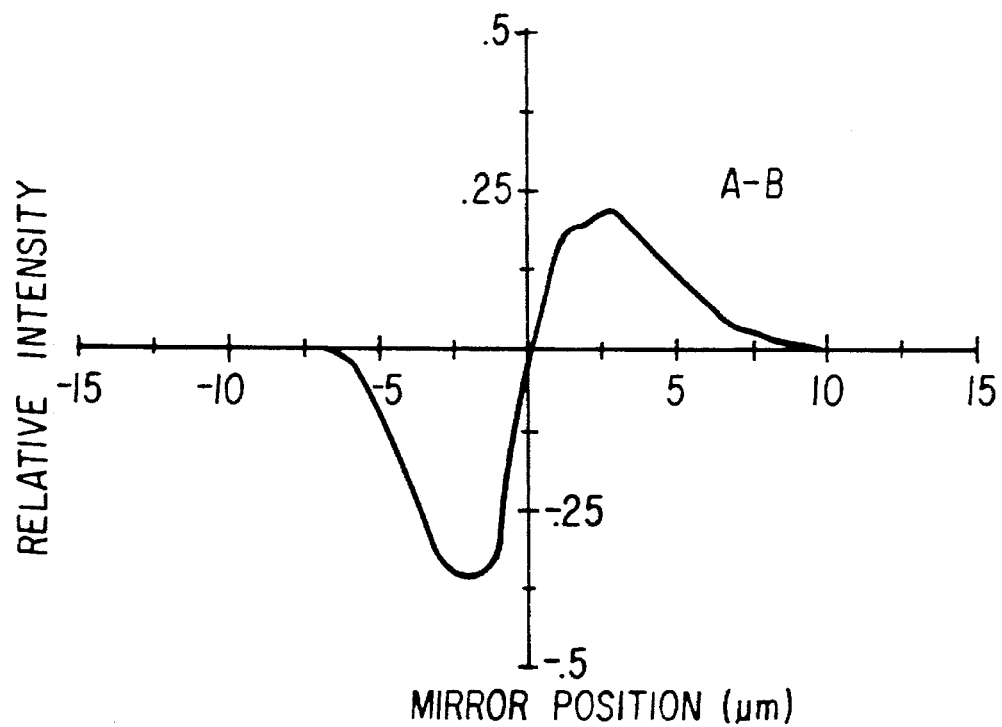
FIG. 10 is a graph of the experimental differential signal for a sweep of the mirror through the focus of the objective lens.

Referring to FIGS. 5, 9 and 10, the return beam from a mock optical recording system having an objective lens with an NA of 0.5 was also input coupled into the grating. The wavelength was still 632.8 nm and the aperture sampled by the grating 12 was determined by the positioning of the grating edge relative to the beam. The grating 12 was segmented into two regions, A and B, and was positioned so that it was contained within the area of the incident beam 14 resulting in a curved boundary 24 on the grating pattern. Relative intensities of input coupling were again monitored by imaging the waveguide streak 26 using a CCD camera. The grating was rotated to an angle where the relative intensities were about the same and the mirror of a mock optical head was scanned through the focus position for the objective lens to simulate a focus error. The coupling response for each segment and the differential signal (A–B) are shown in FIGS. 9–10. The peak-to-peak separation of the bipolar output suggest a working range of $\pm 2.5$ microns. By increasing the difference of the peak input coupling intensity it is possible to extend the working range of the signal processing, however, there must be some overlap of the signals from each segment to avoid having no error signal in the central portion of the information.

A clear advantage of this method for FES detection is that critical alignment of a lens element relative to detectors is not required. Here, the light is directly coupled into a detector pair split to collect the light from the two regions with much higher tolerances for detector placement compared to the critical placement of a split detector pair for the pupil obscuration method. In this example, focusing to small area detectors is desirable only if the signals were to be used for high frequency data processing.

Example 3 Design FES and TES Sensors

In Example 2, only the FES was observed. A method for detecting the FES and tracking error signal (TES) and also minimizing crosstalk between the two signals was devised using a grating segmented into four parts. A standard method of accomplishing this signal detection is by processing the FES and TES information orthogonally with the processing axes dictated by the intensity variations induced by tracking errors. The details of this grating system are presented in FIGS. 11–13. The waveguide device 30 has a substrate 32 with refractive index $n_s$, a waveguide layer 34 with refractive index $n_{wg}$ overlaying the substrate 32, and a cladding layer 36 with refractive index $n_c$ overlaying the waveguide layer 34. The cladding may be a cladding material or may be air depending on the characteristics desired. The waveguide layer 34 has a thickness $t_{wg}$. A grating 38 is formed in the substrate 32 and has a grating length $L_{gr}$, grating pitch $\Lambda$, and grating depth $d_{gr}$. An incident light beam 40 at an angle $\theta$ is diffracted by the grating 38 at an angle $\phi$. The diffracted beam is guided by the waveguide 34. The waveguide layer 34 has four regions, A, B, C and D.

The grating pattern used to sample the optical beam should be shaped to optimize the signals detected. Also shown are additional grating areas which perform other functions for directing the light to detectors but are not important for the error signal processing. These added gratings are included to demonstrate a concept for a working device. Their fabrication is carried out in parallel with the processing grating and can have the same grating pitch. The needed functions are isolation of the light coupled into adjacent regions A–B and C–D and coupling of the light from the waveguide into detectors 39 mounted below or above the substrate. There will be optimum designs for their area and shape, groove depth, and blaze. The grating pattern 38 includes interchip gratings 42, 44, isolation gratings 46, 48, and processing gratings 50, 52.

The configuration of the processing grating segments 50, 52 requires the light coupled into the waveguide 34 to be directed away from the processing grating. Directing the beam can be accomplished by three methods. The first method is using a waveguide of uniform thickness and controlling the grating pitch of each half (50 vs 52). The second method is using a waveguide of uniform thickness and grating of uniform pitch, and selecting the blaze angle of the grating halves (normal incidence input coupling). The third method is using a grating with uniform pitch in all regions and adjusting the effective index of each region (e.g., adjusting the waveguide thickness of each region by addition or removal of material). The third method was used in this example. Control of the nominal coupling angle for adjacent gratings can be accomplished by fabricating gratings having different pitches or by adjusting the effective index as stated above. Again, the latter method was used in this example.

Figure 11:
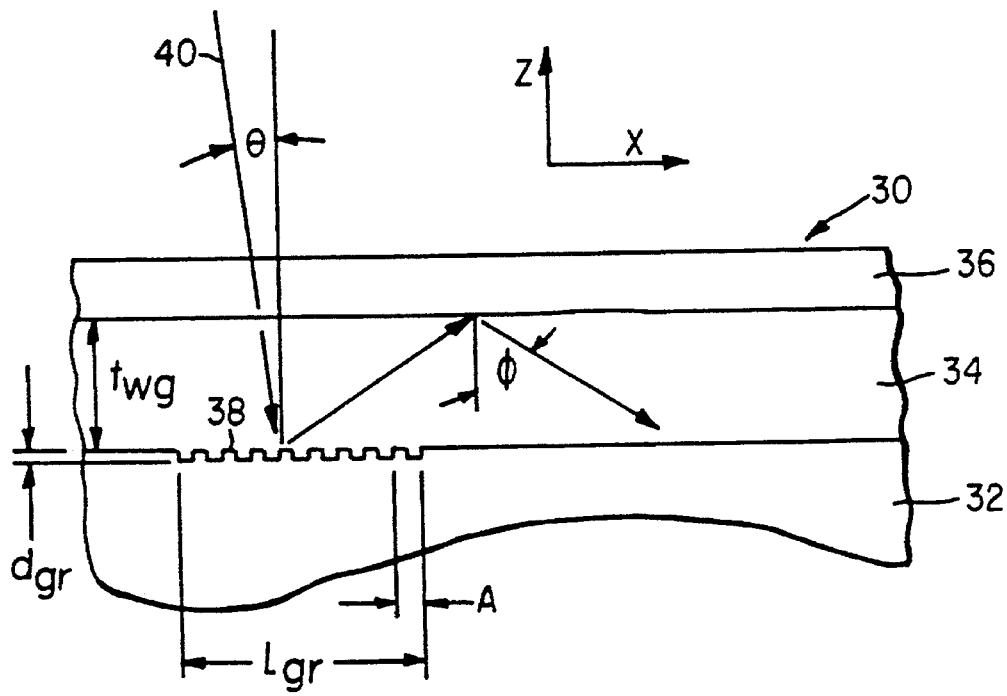
FIG. 11 is a longitudinal sectional view of a waveguide grating system with a ray trace demonstrating the principle of input coupling.
Figure 12:
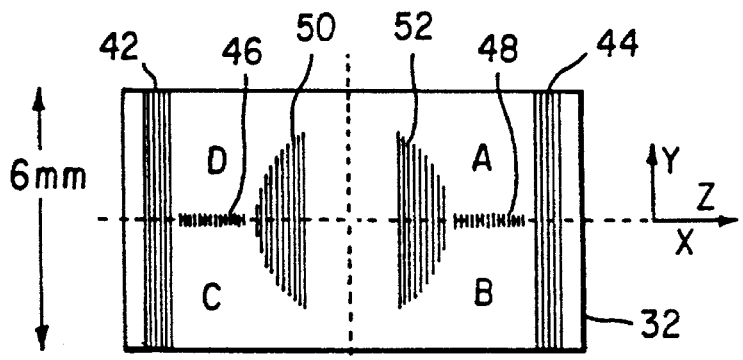
FIG. 12 is a top view of the waveguide grating of FIG. 11 showing a pattern used for simultaneous detection of focus and tracking error signals showing the shape and location of the grating segments.
Figure 13:
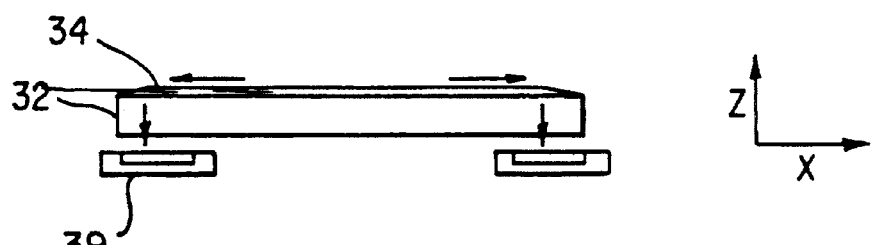
FIG. 13 is a side view of the waveguide structure of FIGS. 11–13 showing the location of the incident beam and photodiode detectors.
Figure 14:
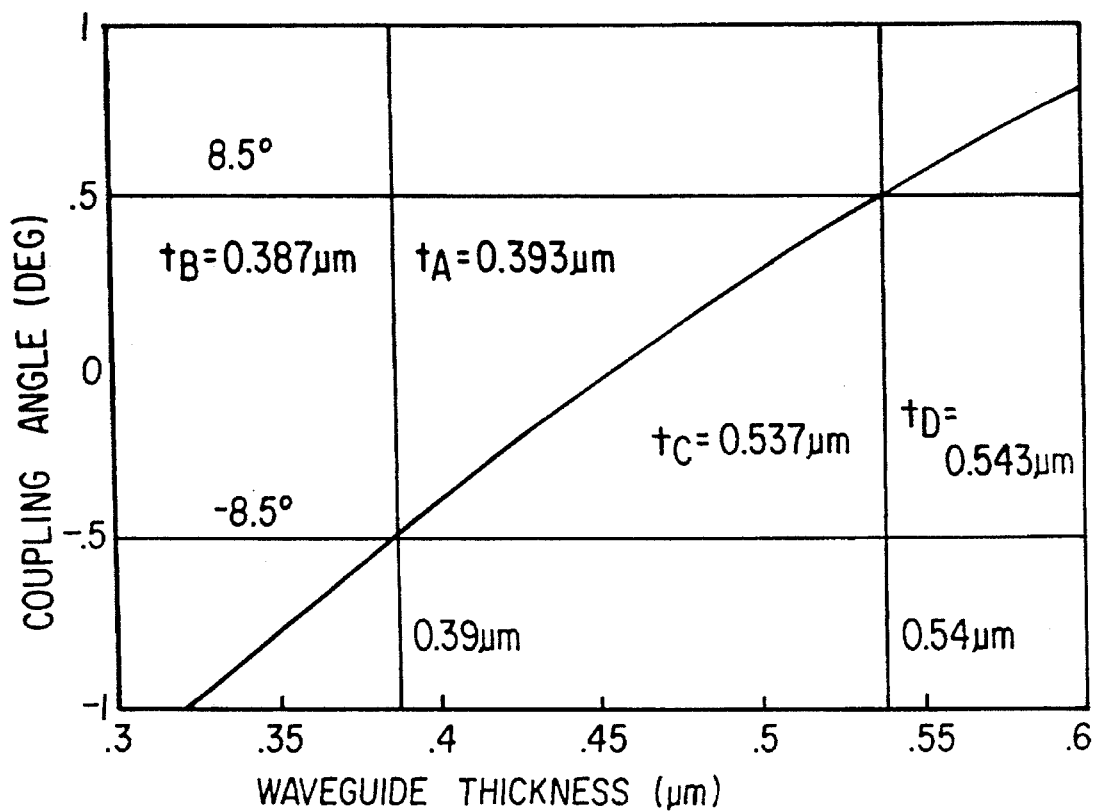
FIG. 14 is a graph showing the dependence of coupling angle on waveguide thickness for the grating system of FIGS. 11–13.
Figure 15:
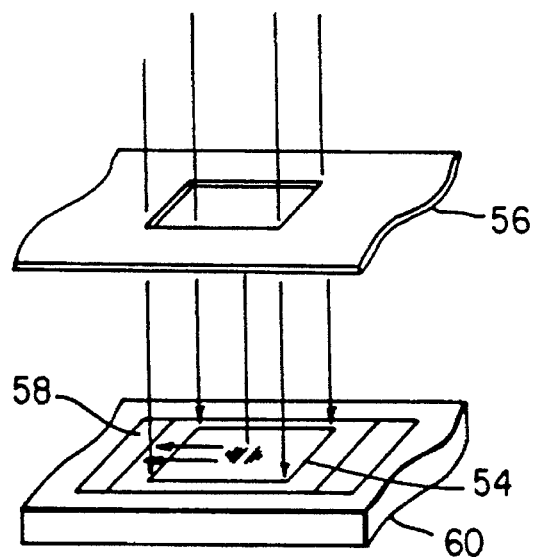
FIGS. 15–17 illustrate the deposition steps for fabrication of a quad-segmented grating showing the deposition mask opening for each deposition step.
Figure 16:
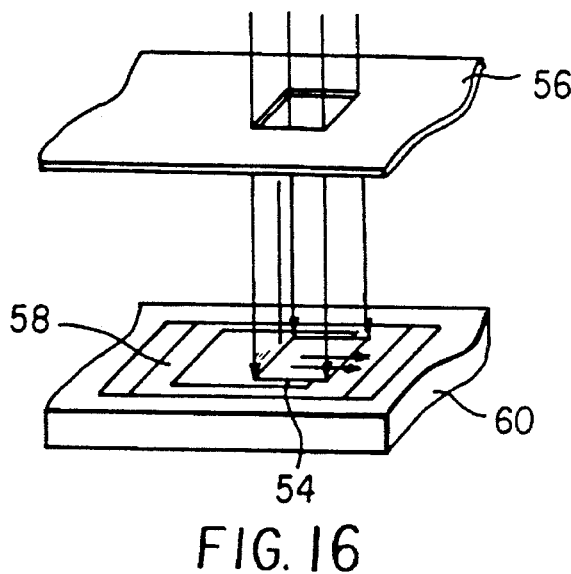
Figure 17:
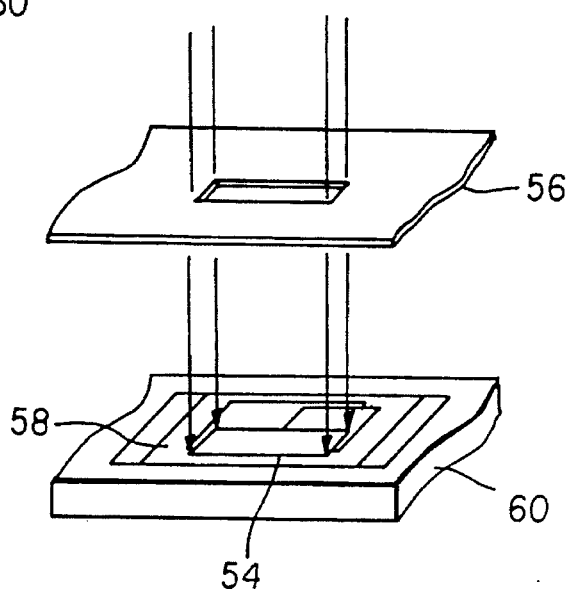

Using standard grating theory and the waveguide system shown in FIGS. 11–13, a grating pitch was selected to properly direct the beam, (i.e., to form halves for the grating with equivalent input coupling angle magnitude but opposite sign). The sign difference results from the difference in the thickness of the waveguide in the regions. The relation between coupling angle and waveguide thickness is shown in FIG. 14. The optimum thicknesses from the model are also indicated for a substrate tilt of 0.5 degrees and the desired thickness for each grating segment $t_A$, $t_B$, $t_C$, and $t_D$.

The steps of the element fabrication are shown in FIGS. 15–18. As in the previous examples, the regions of the grating 54 were created on the substrate 60 with a single deposition process. An externally controlled translation stage was used to position a deposition mask 56 linked to a monitoring system of the thickness of the waveguide 58. In each step a different opening or position of the deposition mask 56 was used to generate different thicknesses in each region. The final thickness for each step was monitored by conventional insitu techniques and monitoring the input coupling characteristics of each region. Other patterns of the deposited thicknesses may be desirable to improve the alignment of the fabricated grating element.

Figure 18:
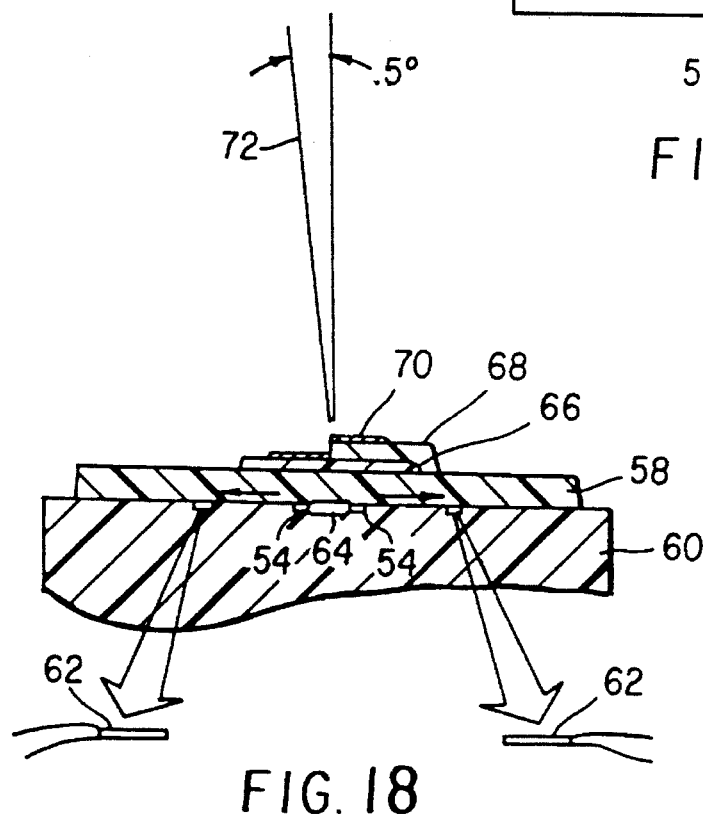
FIG. 18 is a sectional view of the device formed by the deposition steps of FIGS. 15–17.

Referring to FIG. 18, the completed device is illustrated with detectors 62 shown below the substrate 60 with electrical leads. The signal processing gratings (input coupling gratings) 54 are formed in the substrate 60 with an inactive region 64 between the gratings 54. The existing waveguide 58 is shown along with the first, second, and third material additions 66, 68 and 70. In this example, the incident beam 72 is tilted to an angle of 0.5 degrees.

Figure 19:
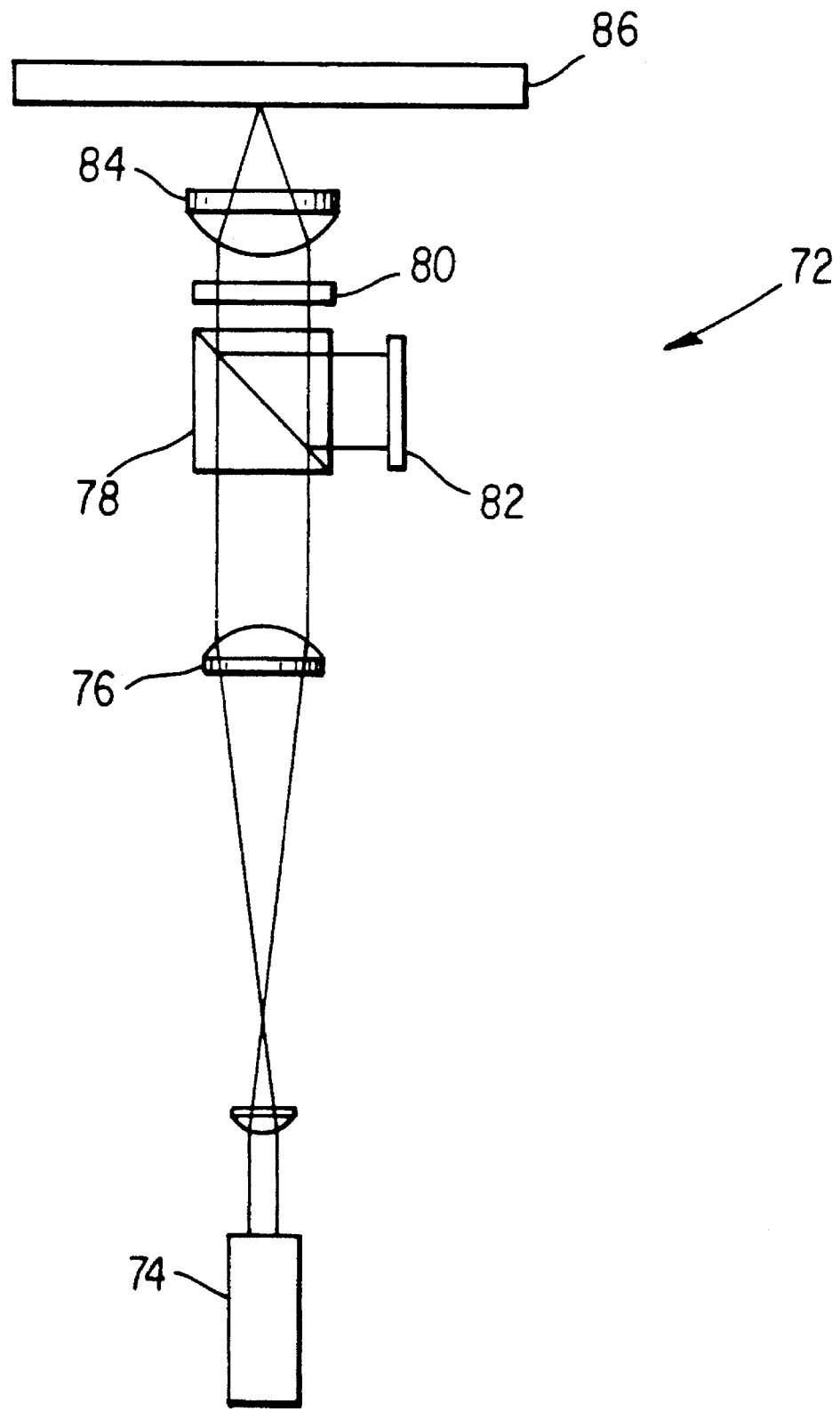
FIG. 19 is a diagram of an optical test system used to generate the focus error signal (FES) and tracking error signal (TES).
Figure 20:
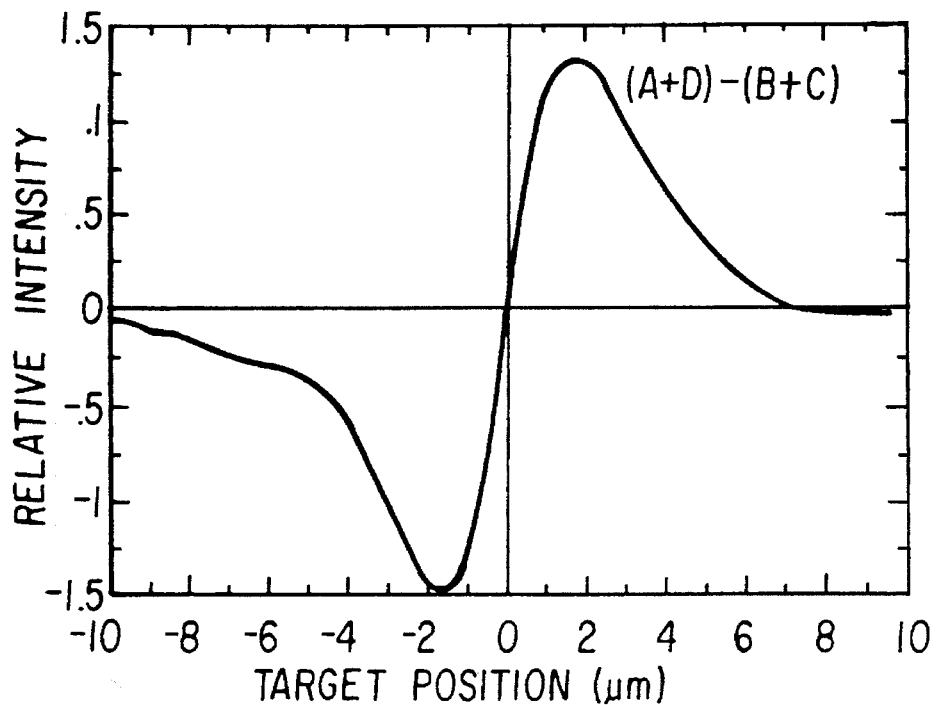
FIGS. 20–22 are graphs showing the results for detection of FES, TES and crosstalk appearing on the FES while de-tracking.
Figure 21:
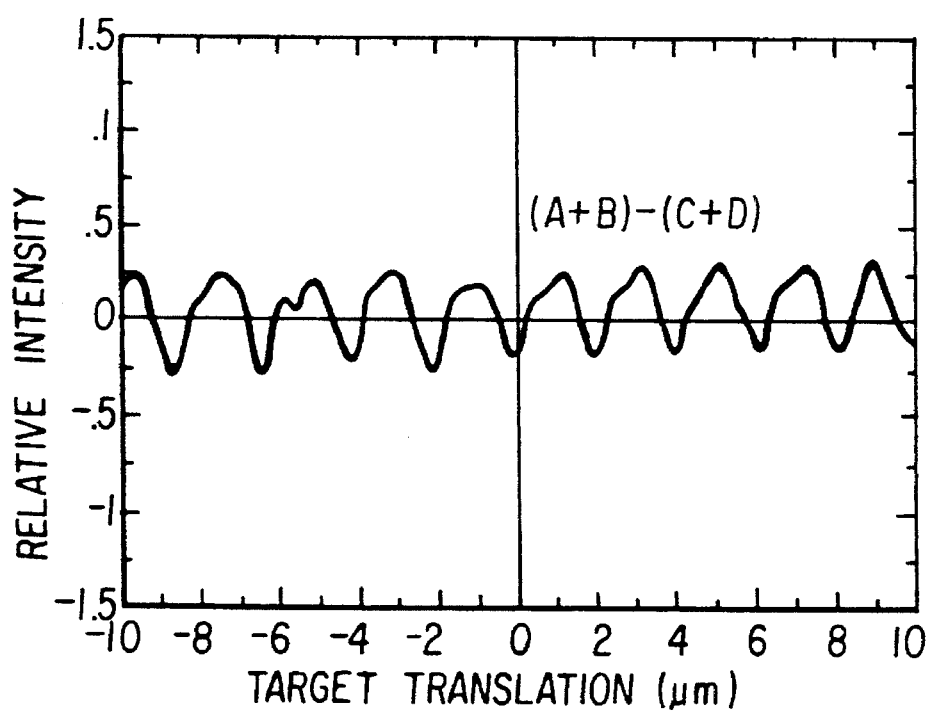
Figure 22:
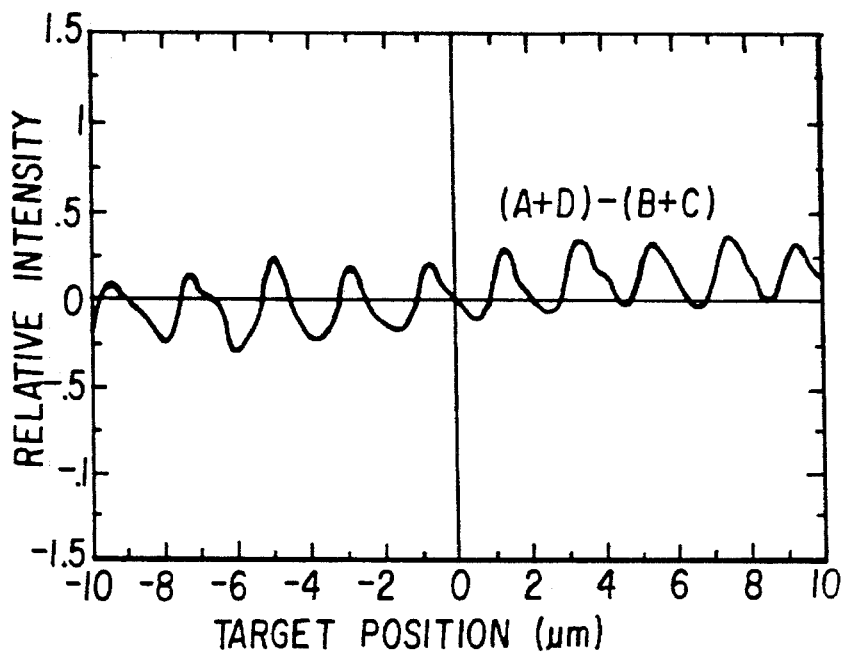

Referring to FIG. 19, the operation of the device was tested by placing it in the return beam path of a mock optical head 72. The mock optical head 72 included a laser light source 74 which directs a beam of light to a collimating lens 76. A polarizing beam splitter 78 is positioned between a quarter-wave plate 80 and the collimating lens 76. The beam splitter 78 directs a portion of the beam returning from the optical disk 86 to the integrated optical grating device 82. The beam from the quarter-wave plate 80 is directed by objective lens 84 onto an optical disk 86. The target disk 86 was translated to produce focus or tracking errors and the appropriate signals monitored. Using the labels for the regions of FIGS. 12–13 to represent the detector output of each region, the following equations represent the error signals FES=(A+D)−(B+C) Focus Error Signal TES=(A+B)−(C+D) Tracking Error Signal PES=(A+C)−(B+D) Pointing Error Signal The PES signal is useful for alignment of the device before operation and should have a value of zero when the element is properly aligned. Results for the FES and TES are shown in FIGS. 20–22. Also shown is the cross-talk occurring on the FES when the target is translated cross-track. These signals are considered to be useful for an optical recordings system.

It can now be appreciated that there has been presented a method for sensing collimation, pointing and intensity asymmetry of an optical beam using waveguide gratings. The method can be applied to optical disk readout to monitor focus and tracking errors and to facilitate alignment of the device. To create these signals, a segmented grating samples the cross-sectional area of the incident beam. Each segment differs in its optimal input coupling angle to provide information about changes in the angle of incidence and the segments are positioned to analyze the symmetry of the incident beam intensity. The grating is patterned to perform multiple functions on the light coupled into the waveguide, including signal processing, isolation of signal channels, and inter-chip communication.

Figure 23A:
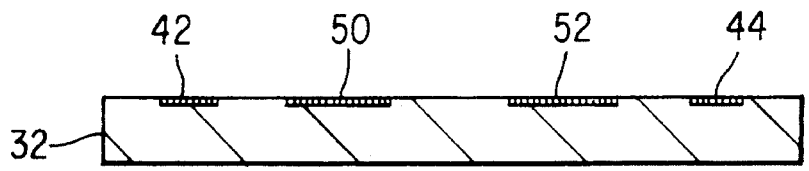
FIGS. 23A–23B are views of the waveguide grating showing a grating pattern where the grooves of the processing grating have different orientations.
Figure 23B:
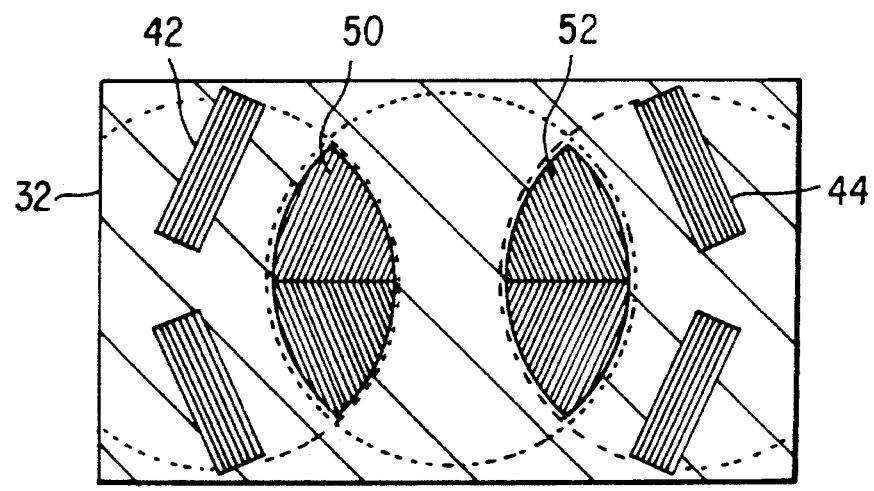

Although a specific grating pattern for 10 the element has been described herein, there are alternative designs which should provide adequate signal processing. For example, the length of the processing grating $L_{gr}$ could be altered to affect the FWHM of the grating response. Also, the grooves of each segment may differ in pitch $\Lambda$ to provide the difference in peak coupling angle and the grooves of each segment may differ in their orientation as illustrated in FIG. 23. The difference in orientation will affect the direction of the light coupled into the waveguide and provide an alternative means of channel isolation.

It can also be appreciated that there has been presented a novel method for generating a focus error signal using a dual-segmented grating and focus and tracking error signals using a quad-segmented grating. There are several concepts for how these principals could be applied to an optical head design to construct a hybrid bulk-integrated optical system. Introducing this element into current optical head designs reduces the number of optical elements and the volume needed to process the error signals.

The method of detection and the directionality provided by the differential signals could be applied to other parameters of a waveguide system where the physical or optical properties of the waveguide or grating are altered or there are changes in the characteristics of the incident beam. This could include: wavelength, polarization, vibrational stability, rotation, device temperature, adsorption, desorption, photo-bleaching, chemical reactions (including electrochemical), and others.

While the invention has been described with particular reference to optical recording technology and more specifically the method of observing focus and tracking error signals needed during optical head writing and readout, it will be understood by those skilled in the art that various changes may be made and equivalents may be substituted for elements of the preferred embodiment without departing from the invention. For example, a linear grating used for input coupling into waveguides can be designed to process these essential signals. Although a specific application of this processing element is described, the sensitivity of the device to the surrounding environment (i.e., the effects of the environment on the physical or optical characteristics of the waveguide system) and the characteristics of the input beam would allow its use as a general tool for analysis in many other optical sensor systems. Integrated optical components have advantages of being planar, alignment is part of fabrication, and integration with detectors and preamplifiers is facilitated when using silicon based substrates. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A waveguide device comprising:

a substrate having a surface lying in a plane defined by perpendicular x and y axes; a plurality of waveguide regions formed on the substrate which input couple a return beam that has undergone change in at least one of collimation and asymmetry; wherein each of the waveguide region has a different nominal input coupling angle and each of the nominal coupling angel is separated from each other to provide some overlap of signals from each waveguide regions such that the waveguide regions are angularly detuned to provide a continuous error signal; each of the waveguide regions includes a linear input coupling grating segment; the orientation, relative to said x and y axes, of each linear input coupling grating in each of the plurality of waveguide regions is different; a waveguide layer segment formed over the input coupling grating; a cladding layer contacting the waveguide layer segment; a plurality of detectors that correspond to the plurality of waveguide regions; and means for transferring light coupled in each waveguide region to its corresponding detector.

2. A waveguide device as claimed in claim 1, wherein the linear input coupling grating segment is formed on said surface of said substrate.

3. A waveguide device as claimed in claim 1, wherein each waveguide layer segment has a different thickness.

4. A waveguide device as claimed in claim 1, wherein each linear input coupling grating segment has a different pitch.

5. A waveguide device as claimed in claim 1, wherein the waveguide regions have different refractive indices.

6. A waveguide device as claimed in claim 1, wherein a first waveguide region has a first nominal coupling angle and a second waveguide region has a second nominal coupling angle, wherein said first nominal coupling angle is separated from said second nominal coupling angle by about full-width-half-maximum of coupling efficiency.

* * * * *